United States Patent Office 3,520,708
Patented July 14, 1970

3,520,708
MANUFACTURE OF CALCIUM SULPHATE HEMIHYDRATE
Geoffrey Prytherch Campbell Chambers, St. Albans, Hertfordshire, and Michael Robert Damm, London, England, assignors to Berk Limited
No Drawing. Filed Dec. 12, 1966, Ser. No. 600,754
Claims priority, application Great Britain, Dec. 23, 1965, 54,570/65, 54,571/65
Int. Cl. C04l 11/02
U.S. Cl. 106—110                    9 Claims

ABSTRACT OF THE DISCLOSURE

An α-calcium sulphate hemihydrate plaster composition having a longer setting time than usually results from mixing plaster retarders with calcium sulphate hemihydrates is obtained by calcining a mixture of gypsum and a plaster retarder at an elevated temperature and pressure to form α-calcium sulphate hemihydrate in the presence of the retarder.

---

This invention is concerned with the manufacture of calcium sulphate hemihydrate, and more particularly α-calcium sulphate hemihydrate.

Calcium sulphate hemihydrate forms the basis of gypsum plasters and is manufactured by dehydration of gypsum until about 15% by weight of the gypsum has been lost as water. Calcium sulphate hemihydrate may be prepared either by the kettle process (calcination of gypsum in an autoclave at elevated temperature and pressure) or by the pan process (calcination of gypsum at atmospheric pressure).

There are two types of calcium sulphate hemihydrate, the α- and β-hemihydrates, which differ structurally. When gypsum is calcined by the kettle process the α-hemihydrate is obtained, the β-hemihydrate being obtained in calcination by the pan process.

When either the α- or β-hemihydrate is gauged with water a paste or slurry is formed which sets within a very short time to a hard mass of crystalline calcium sulphate dihydrate. The time taken, measured from the moment the appropriate amount of water is added, to reach this hard mass state is known as the setting time of the plaster and is generally 5–7 minutes, an inconveniently short time for general plastering operations.

It is known that the setting time of hemihydrate plasters can be extended by incorporating in the calcined gypsum a small proportion of one or more materials known as retarders prior to mixing the hemihydrate with water. The retarder may be added to the hemihydrate as a dry particulate material or it may be added in solution. Retarders suggested for this purpose have been inorganic compounds, such as calcium hydroxide, calcium orthophosphate, boric acid, borax, sodium carbonate, sodium bisulphate, sodium sulphate, potassium sulphate, mono-, di- and tri-ammonium phosphate and ammonium borate, organic compounds such as keratin, cellulose ethers, cane sugar and gum arabic and ammonium and metal salts of organic acids such as sodium or ammonium salts of citric, gluconic, and aconitic acids, calcium salts of propionic, maleic succinic and citric acids and certain aluminum, ferrous, ferric, copper, zinc, manganese, chromium and nickel salts of organic acids.

We have discovered that by adding a given amount of certain of these retarders to gypsum prior to calcining by the kettle process, it is possible to produce an α-hemihydrate plaster having a longer setting time than that obtainable by adding the same amount of retarder to gypsum which has been calcined under the same conditions of temperature and pressure.

According to the present invention, therefore, there is provided a process for making an α-calcium sulphate hemihydrate plaster composition which comprises calcining a mixture of gypsum and an inorganic or organic metal salt plaster retarder at an elevated temperature and pressure to form α-calcium sulphate hemihydrate.

The temperatures and pressures used in carrying out the process of the invention are those normally employed in the manufacture of the α-hemihydrate. Thus, temperatures within the range of 130° to 250° C. are used, the preferred operating temperature being about 200° C. Generally the pressure in the autoclave is determined by the operating temperature and is of the range 20 to 400 pounds per square inch gauge (1.4 to 30 kg. per square centimetre), preferably about 250 pounds per square inch gauge (17.6 kg. per square centimetre).

In addition to the inorganic and organic metal salt plaster retarders mentioned above, we have found that lithium hydroxide and lithium salts of mineral acids are suitable retarders when added to the gypsum before calcination. Examples of lithium salts which can be used for this purpose are lithium chloride, lithium nitrate, lithium sulphate and lithium phosphate.

The amount of plaster retarder necessary to give an extended setting time will depend on the compound or combination of compounds used. Generally, it is necessary to add the plaster retarder in a proportion of at least 1% by weight of the gypsum although as little as 0.5% by weight of gypsum will substantially extend the setting time. Although more than 5%, for instance 10%, by weight of gypsum, of plaster retarder may be employed, the setting time of the plaster with the larger proportion of plaster retarder is not necessarily greater than that of the plaster which contains 5% by weight of plaster retarder.

The gypsum and plaster retarder can be mixed by any suitable technique, ball milling being preferred.

In addition to the plaster retarder, the plaster compositions may contain other materials normally added to hemihydrate plasters, for example, wood shavings, wood dust or other light fillers. These other materials are normally added after calcination, but if any additional constituent of the plaster composition which it is desired to include, is not deleteriously affected by the conditions of calcination, it can be added to the gypsum and retarder mixture prior to calcination.

In order that the invention may be more fully understood the following examples are given by way of illustration only, all parts being parts by weight unless stated otherwise.

The setting times of the plasters were determined by the Vicat needle test according to B.S. 1370: 1958 Appendix F, pages 25–26 and the terms Initial Setting Time and Final Setting Time used hereinafter indicate the onset and completion of setting respectively measured from the time water was added.

EXAMPLE 1

1300 grams of gypsum were mixed with 13 grams of diammonium hydrogen phosphate as plaster retarder in a ball mill for 15 minutes. The mixture of gypsum and plaster retarder was then charged to an autoclave, brought to a temperature of 130° to 150° C. and a pressure of 20 to 40 pounds per square inch gauge (1.5 to 3 kg./sq. cm.) and maintained under these conditions until 15% by weight of the gypsum was lost as water. The product was allowed to cool, removed from the autoclave, ground to pass 100 mesh British Standard Sieve (150 micron nominal aperture) and mixed with water in the proportion of 3 parts of hemihydrate to 2 parts of water. The plaster had an initial setting time of 1 hour 30 minutes and a final setting time of 2 hours 30 minutes.

The process of Example 1 was repeated without the addition of diammonium hydrogen phosphate. The initial and final setting times were determined as before and the plaster set instantaneously after 5 minutes.

EXAMPLES 2 AND 3

The process of Example 1 was repeated at different calcining temperatures and pressures. The setting time results obtained are shown in Table 1 below.

TABLE 1

| Ex. | Tempera-ture ° C. | Pressure p.s.i.g. (kg./sq. cm. g.) | Percent H₂O removed in calcination | Initial setting time | Final setting time hours |
|---|---|---|---|---|---|
| 2 | 200 | 150-0 (10.5-0) | 14.1 | 5 hrs. 20 mins. | >24 |
| 3 | 200 | 250-0 (17.6-0) | 15.0 | >7 hrs. | <24 |

EXAMPLES 4–7

The procedure of Example 1 was repeated for different amounts of diammonium hydrogen phosphate. The setting time results obtained are given in Table 2 below.

TABLE 2

| Example | Percent (NH₄)₂HPO₄ by wt. of gypsum | Tempera-ture, C. | Pressure, p.s.i.g. (kg./sq. cm. g.) | Percent H₂O removed in calcination | Initial setting time | Final setting time |
|---|---|---|---|---|---|---|
| 4 | 0.05 | 250 | 310-30 (21.8-2.1) | 15 | 7 hrs. | 24 hrs. |
| 5 | 5 | 150 | 40 (3) | 15 | 4 hrs. | 12 hrs. |
| 6 | 10 | 130-150 | 20-40 (1.4-3) | 15 | 50 mins. | 1 hr., 10 mins. |
| 7 | 5 | 125 | 16 (11.2) | 15 | 22 mins. | 23 mins. |

EXAMPLES 8–9

The process of Example 1 was repeated for different plaster retarders using various calcining temperatures and pressures. The setting time results are given in Table 3 below. The percentage of plaster retarder is based on the weight of gypsum.

TABLE 3

| Ex. | Plaster retarder | Tempera-ture, C. | Pressure p.s.i.g. (kg./sq. cm. g.) | Percent H₂O removed in calcination | Initial setting time | Final setting time |
|---|---|---|---|---|---|---|
| 8 | 1% ammonium acetate | 140 | 35-10 (2.5-0.7) | 15 | 2 days | 2-3 days |
| 9 | 1% diammonium hydrogen phosphate plus 1% strontium hydroxide. | 130-150 | 20-40 (1.4-3) | 15 | 2 hours 30 mins. | 3 hrs. |

EXAMPLES 10–12

The process of Example 1 was repeated using 5% by weight of gypsum of diammonium hydrogen phosphate as plaster retarder. The method of incorporation of the plaster retarder in the gypsum was varied as shown in Table 4 below. Different setting times of the plasters were obtained and these are also shown in Table 4.

TABLE 4

| Ex. | Method of incorporation of plaster retarder | Tempera-ture, ° C. | Pressure, p.s.i.g. (kg./sq. cm. g.) | Percent H₂O removed in calcination | Initial setting time | Final setting time |
|---|---|---|---|---|---|---|
| 10 | Ball milling | 130-150 | 20-40 (1.4-3) | 15 | 1 hour 30 mins. | 2 hours 30 mins. |
| 11 | Hand mixing | 130-150 | 20-40 (1.4-3) | 15 | 15 mins. | 18 mins. |
| 12 | Reduced ball charge | 130-150 | 20-40 (1.4-3) | 15 | 55 mins. | 58 mins. |

EXAMPLE 13

1300 grams of gypsum were mixed with 7.5 grams of lithium hydroxide as plaster retarder in a ball mill for 15 minutes. The mixture of gypsum and plaster retarder was then changed to an autoclave, brought to a temperature of 140° C. and a pressure of 35–10 pounds per square inch (2.5–0.7 kg./sq. cm.) gauge and maintained under these conditions until 15% by weight of the gypsum was lost as water. The product was allowed to cool, removed from the autoclave, ground to pass 100 mesh British Standard Sieve (150 micron nominal aperture) and mixed with water in the proportion of 3 parts of hemihydrate to 2 parts of water. The plaster had an initial setting time of 7.00 hours and a final setting time of less than 24 hours.

The process was repeated without the addition of lithium hydroxide using a calcining temperature of 130 to 150° C. and a pressure of 20 to 40 pounds per square inch (1.4–3 kg./sq. cm.) gauge. The initial and final setting times were determined as before and the plaster set instantaneously after 5 minutes.

EXAMPLES 14–17

The process of Example 13 was repeated using varying amounts of lithium hydroxide and different calcining temperatures and pressures. The setting time results obtained are given in Table 5 below.

TABLE 5

| Example | Percent lithium hydroxide | Temperature, °C. | Pressure, p.s.i.g. (kg./sq. cm. g.) | Initial setting time | Final setting time |
|---|---|---|---|---|---|
| 14 | 0.1 | 140 | 35–10 (2.5–0.7) | 4 minutes | 5 minutes. |
| 15 | 1.0 | 130–150 | 20–40 (1.4–3) | 7 hours | 8 hours 30 minutes. |
| 16 | 1.0 | 136 | 35–40 (2.5–3) | 3 hours 25 minutes. | 10 to 24 hrs. |
| 17 | 5.0 | 130–150 | 20–40 (1.4–3) | 7 hours | 8 hours 30 minutes. |

EXAMPLE 18

The process of Example 13 was repeated using as plaster retarder 1% of lithium sulphate instead of lithium hydroxide. The mixture of gypsum and plaster retarder was calcined at 140–150° C. and 60 to 30 pounds per square inch (4.2–2.1 kg./sq. cm.) gauge until 15.4% by weight of the gypsum had been removed as water. The plaster had an initial setting time of 1 hour 55 minutes and a final setting time of less than 24 hours.

EXAMPLE 19

The process of Example 13 was repeated using as plaster retarder 1% of lithium phosphate. The calcining temperature was 140–160° C. and the calcining pressure 65 to 70 pounds per square inch (4.6–4.9 kg./sq. cm.) gauge. Calcining was carried out until 15.4% by weight of the gypsum had been removed as water. The plaster had an initial setting time of 6 hours and a final setting time of less than 24 hours.

EXAMPLES 20–26

Further comparative tests were carried out to determine the setting times obtained when the retarder was added to the hemihydrtae after calcination. Varying amounts of diammonium hydrogen phosphate (DAHP) and lithium hydroxide were added to the hemihydrate produced by calcining gypsum in an autoclave at 150°–160° C. under a pressure of at least 60 p.s.i.g. The different setting times of the plaster compositions were obtained and these are shown in Table 6 below. The plaster composition was mixed with water in a 3:2 weight ratio.

TABLE 6

| Example | Retarder | Wt. percent Retarder | Initial Setting time (mins.) |
|---|---|---|---|
| 20 | None | | 6.5 |
| 21 | DAHP | 1 | [1] 5 |
| 22 | DAHP | 5 | [1] 13 |
| 23 | DAHP | 10 | [1] 14 |
| 24 | LiOH. H$_2$O | 0.5 | 7 |
| 25 | LiOH. H$_2$O | 1.0 | 7 |
| 26 | LiOH. H$_2$O | 5.0 | 8 |

[1] Approximate.

We claim:

1. In a process for making an α-calcium sulphate hemihydrate plaster composition containing a plaster retarder, which process comprises calcining gypsum at an elevated temperature and pressure in a closed vessel to convert the gypsum to α-calcium sulphate hemihydrate, the improvement which comprises intimately mixing with the gypsum before it is calcined, from about 0.5 to 10% by weight of at least one plaster retarder, said plaster retarder being in dry particulate form and being selected from the group consisting of lithium hydroxide, lithium chloride, lithium sulphate, lithium nitrate, lithium phosphate, calcium hydroxide, calcium orthophosphate, boric acid, borax, sodium carbonate, sodium bisulfate, mono- di- and tri-ammonium phosphate, ammonium borate, keratin, cellulose ethers, cane sugar, gum arabic, ammonium salts of acetic, citric, gluconic, and aconitic acids, sodium salts of citric, gluconic, and aconitic acids, and calcium salts of propionic, maleic, succinic and citric acid.

2. The process of claim 1 wherein the plaster retarder is lithium hydroxide.

3. The process of claim 1 wherein the plaster retarder is a lithium salt of a mineral acid.

4. The process of claim 1 wherein the plaster retarder is mixed with the gypsum by ball milling.

5. A method of making an α-calcium sulphate hemihydrate plaster composition having an extended setting time which comprises:
   (i) adding to, and intimately mixing with ground gypsum at least one plaster retarder selected from the group consisting of lithium hydroxide, lithium salts of mineral acids, ammonium acetate and diammonium hydrogen phosphate, the amount of said retarder being from about 0.5 to 5% by weight of the gypsum,
   (ii) calcining the intimate mixture of gypsum and the said plaster retarder in a closed pressure vessel at a temperature of from 130° to 250° C. and at a pressure of from 20 to 400 pounds per square inch gauge, the calcination being continued at said temperature and pressure until the gypsum is substantially completely converted to α-calcium sulphate hemihydrate,
   (iii) releasing the pressure in the vessel, and
   (iv) recovering the calcined mixture, from the vessel.

6. The method of claim 5 wherein the plaster retarder is lithium hydroxide.

7. The method of claim 5 wherein the plaster retarder is a lithium salt of a mineral acid.

8. The method of claim 5 wherein the plaster retarder is diammonium hydrogen phosphate.

9. The method of claim 5 wherein the plaster retarder is in dry particulate form and is mixed with the gypsum by ball milling.

References Cited

UNITED STATES PATENTS

| 3,081,152 | 3/1963 | Johnson | 106—111 |
| 1,960,538 | 5/1934 | Hoggatt | 106—110 |
| 3,423,172 | 1/1969 | Cafferata | 106—110 |

JAMES E. POER, Primary Examiner

U.S. Cl. X.R.

106—111, 112, 114, 115, 315